US009010824B2

United States Patent
Hayes

(10) Patent No.: US 9,010,824 B2
(45) Date of Patent: Apr. 21, 2015

(54) CARGO STRAP WITH HANDLE

(71) Applicant: John W. Hayes, St. Augustine, FL (US)

(72) Inventor: John W. Hayes, St. Augustine, FL (US)

( * ) Notice: Subject to any disclaimer, the term of this patent is extended or adjusted under 35 U.S.C. 154(b) by 0 days.

(21) Appl. No.: 13/676,194

(22) Filed: Nov. 14, 2012

(65) Prior Publication Data

US 2014/0132017 A1 May 15, 2014

(51) Int. Cl.
*A45F 5/00* (2006.01)
*B65G 7/12* (2006.01)

(52) U.S. Cl.
CPC .................................. *B65G 7/12* (2013.01)

(58) Field of Classification Search
USPC .......... 294/150, 153, 156, 165; 224/250, 917; 224/218, 264; 24/170, 193, 68 CD, 265 BC
See application file for complete search history.

(56) References Cited

U.S. PATENT DOCUMENTS

| | | | | | |
|---|---|---|---|---|---|
| 2,442,266 | A | * | 5/1948 | Davis | 410/96 |
| 3,678,542 | A | * | 7/1972 | Prete, Jr. | 24/191 |
| 4,116,374 | A | * | 9/1978 | Garello | 294/150 |
| 5,005,527 | A | * | 4/1991 | Hatfield | 119/793 |
| 5,161,351 | A | * | 11/1992 | Woodruff | 54/6.1 |
| 5,431,365 | A | * | 7/1995 | Hopkins | 248/683 |
| 5,832,569 | A | * | 11/1998 | Berg | 24/170 |
| 6,470,533 | B1 | * | 10/2002 | Comstock | 16/445 |
| 6,543,096 | B2 | * | 4/2003 | Settelmayer et al. | 24/170 |
| 7,121,122 | B2 | * | 10/2006 | Levi | 70/18 |
| 2003/0019080 | A1 | * | 1/2003 | Anthony et al. | 24/68 R |
| 2008/0010786 | A1 | * | 1/2008 | Huang | 24/170 |
| 2011/0209314 | A1 | * | 9/2011 | Miller | 24/68 CD |
| 2012/0013140 | A1 | * | 1/2012 | Nitkin | 294/153 |

OTHER PUBLICATIONS

W.W. Grainger, Inc.; Erickson Ratchet Strap, S Hook; W.W. Grainger Online Catalog Item 5EFE0, Erickson Model No. 31352 (Apr. 2012); W.W. Grainger, Inc. (Lake Forest, Illinois, U.S.A.).
W.W. Grainger, Inc.; Safety Pin, Double Wire Snap; W.W. Grainger Online Catalog Item 3DZN8 (Apr. 2012); W.W. Grainger, Inc. (Lake Forest, Illinois, U.S.A.).
W.W. Grainger, Inc.; Ancra International Web Strap, Cam Buckle; W.W. Grainger Online Catalog Item 3YAX9, Ancra International Model No. 6G4242MIN92P2 (Apr. 2012); W.W. Grainger, Inc. (Lake Forest, Illinois, U.S.A.).

* cited by examiner

*Primary Examiner* — Saul Rodriguez
*Assistant Examiner* — Gabriela Puig
(74) *Attorney, Agent, or Firm* — Walker, McKenzie & Walker, P.C.

(57) ABSTRACT

A cargo strap with carrying handle and mechanism for securing the cargo strap around a load. A first end of the cargo strap is preferably removably anchored to the strap securing mechanism by a clevis pin that permits rapid and easy disconnection of the first end of the cargo strap from the strap securing mechanism. The second end of the cargo strap is retained within the strap securing mechanism and prevented from removal therefrom by a stop proximate the second end of the cargo strap. The stop is preferably constructed as a loop formed in the second end of the cargo strap and sewn to the strap with a strap flap portion intermediate the second end of the cargo strap and the strap securing mechanism. The strap securing mechanism preferably has either a ratchet style mechanism with a reel or a modified cam buckle mechanism.

10 Claims, 6 Drawing Sheets

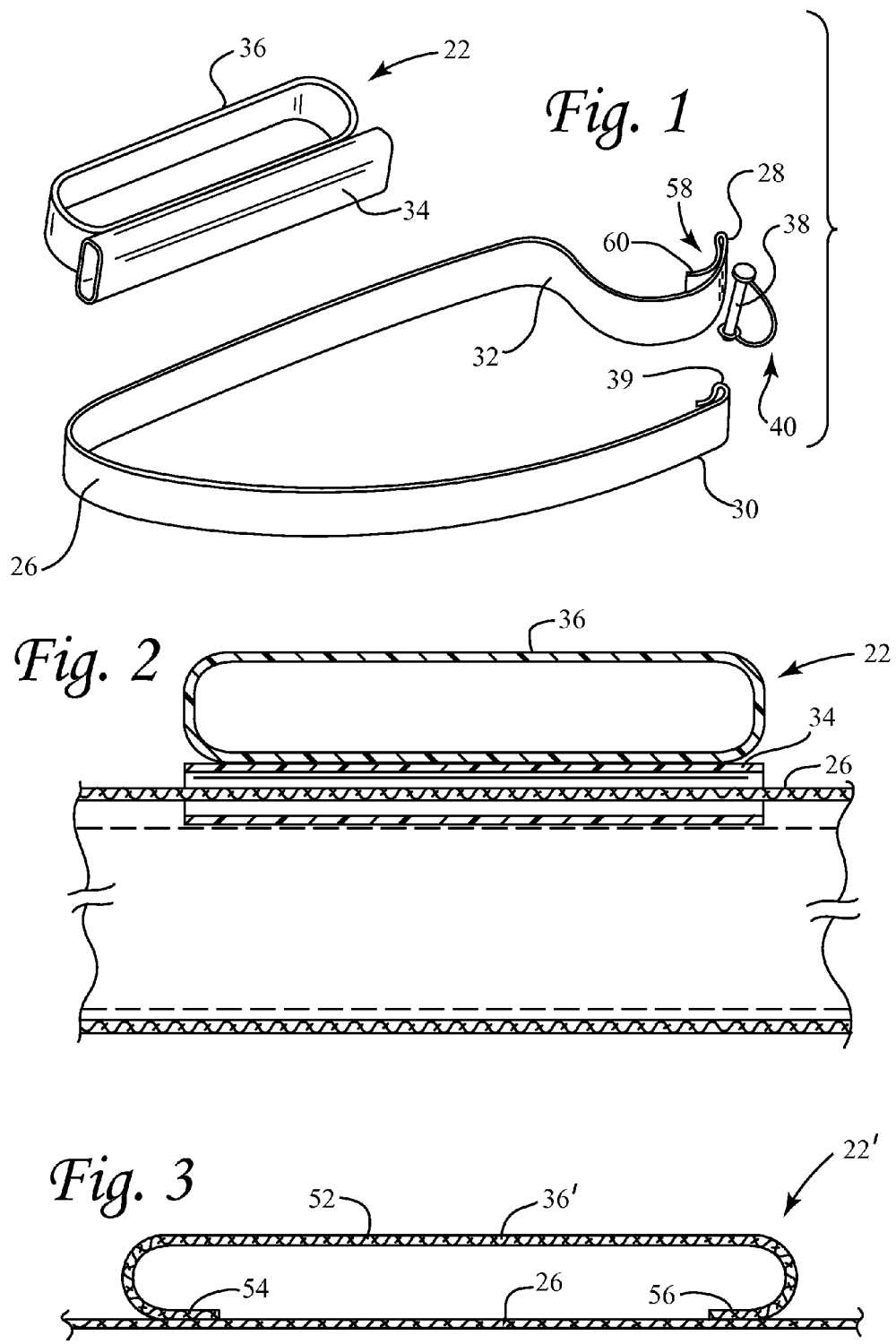

CARGO STRAP WITH HANDLE

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO COMPACT DISC(S)

Not applicable.

BACKGROUND OF THE INVENTION

1. Field of the Invention

The present invention relates, in general, to straps for carrying packages, and in particular, to adjustable straps with handles for carrying packages.

2. Information Disclosure Statement

It is often desired to transport cumbersome bundles and packages from one place to another. Cargo straps for lashing bundles together and/or to a vehicle are also well known and are generally of three types.

A first type is a so-called "Ratchet Style" cargo strap, and has an ratchet adjustment mechanism. A first strap, typically of canvas or nylon, is permanently attached at one end to one side of the ratchet adjustment mechanism, and a first "S hook" is typically permanently attached to the other end of the first strap. A second strap has a first end that is fed through a slot on a reel of the ratchet mechanism, thereby entrapping the load. The strap is then pulled tight through the ratchet mechanism and then the ratchet mechanism, by repeated pivoting movement of the mechanism's arm, causes the strap to become wound upon the reel in a manner well-known to those skilled in the art, thereby tightening the strap around the load as a pawl of the ratchet mechanism prevents unwinding of the reel. The pawl of the ratchet mechanism can be manually released to allow the strap to be unwound from the reel. A second "S hook" is typically permanently attached to the other end of the second strap. In one mode of use, the hooks may be attached to a platform, such as a bed of a truck, and the straps are secured over a load and then the mechanism's arm is operated to adjust the length of the straps between the two hooks, thereby tightening the straps over the load and securing the load to the platform. In a second mode of use, the straps are brought around the load and the hooks are hooked together, and then the arm of the ratchet mechanism is operated to tighten the straps around the load, thereby binding separate parts of the load together. As the pivoting arm of the ratchet adjustment mechanism is raised and lowered, the strap is wound upon the reel and thus incrementally tightens the strap about the load. A representative well-known ratchet strap with S hooks is the Erickson Ratchet Strap with S Hook, Erickson Model No. 31352, sold as catalog item number 5EFE0 by W.W. Grainger, Inc., 100 Grainger Parkway, Lake Forest, Ill. 60045.

A second type of prior art cargo strap device is a modification of the first type of cargo strap device and uses the same ratchet mechanism. With this prior art modified ratchet style cargo strap device, only a single strap, typically of canvas or nylon, is provided, having one end that is permanently attached at one end to the ratchet mechanism. The other end of the strap is passed around a load and then through a slot on a reel of the ratchet mechanism, thereby entrapping the load. As before, the strap is then pulled tight through the ratchet mechanism and then the ratchet mechanism, by repeated pivoting movement of the mechanism's arm, causes the strap to be wound upon the reel in a manner well-known to those skilled in the art, thereby tightening the strap around the load. As before, the pawl can be released to allow the strap to be unwound from the reel.

A third type of prior art cargo strap is the so-called "Cam Buckle Style" cargo strap, somewhat similar in structure to the Rachet Style cargo strap, heretofore described, but has a cam buckle mechanism that replaces the ratchet adjustment mechanism. A first strap, typically of canvas or nylon, is permanently attached at one end to one side of the cam buckle mechanism, and a first "S hook" is typically permanently attached to the other end of the first strap. A second strap has a first end that is fed through the cam buckle mechanism, and a second "S hook" is typically permanently attached to the other end of the second strap. In one mode of use, the hooks may be attached to a platform, such as a bed of a truck, and the straps are secured over a load and then the cam buckle mechanism is operated to adjust the length of the straps between the two hooks, thereby tightening the straps over the load and securing the load to the platform. In a second mode of use, the straps are brought around the load and the hooks are hooked together, and then the cam buckle mechanism is operated to tighten the straps around the load, thereby binding separate parts of the load together. As the pivoting cam arm of the cam buckle mechanism is operated, teeth on the cam arm grip and hold the strap that passes through the cam buckle mechanism after the strap is pulled tight. A representative well-known cam buckle mechanism with S hooks is the Ancra International Cam Buckle style Web Strap with S Hooks, Ancra International Model No. 6G4242MIN92P2, sold as catalog item number 3YAX9 by W.W. Grainger, Inc., 100 Grainger Parkway, Lake Forest, Ill. 60045.

These prior art cargo straps have several problems. First, as the free end of the strap becomes worn, it is difficult to insert that free end through the cam buckle mechanism or ratchet mechanism. This causes difficulty and increased time when securing cargo strap around a load. Second, once the cargo strap is secured around the load, it is difficult and cumbersome to carry the load, which might be bulky, especially when other items are being carried at the same time.

It is therefore desirable to have a cargo strap that can be more quickly secured around a load than prior art cargo straps, and which provides means for easily carrying the secured load.

It is not believed that prior art cargo straps and related securing mechanisms, either singly or in combination, disclose or suggest the present invention.

BRIEF SUMMARY OF THE INVENTION

The present invention is a cargo strap with carrying handle and a mechanism for securing the cargo strap around a load. To eliminate the problem in the prior art whereby a worn or frayed strap end cannot be easily inserted through the strap securing mechanism, a first end of the cargo strap is preferably removably anchored to the strap securing mechanism by a clevis pin that permits rapid and easy disconnection of the first end of the cargo strap from the strap securing mechanism. The second end of the cargo strap is retained within the strap securing mechanism and prevented from removal therefrom by a stop proximate the second end of the cargo strap. The stop is preferably constructed as a loop formed in the second end of the cargo strap and sewn to the strap with a strap flap portion intermediate the second end of the cargo strap and the strap securing mechanism. The strap securing mechanism preferably has either a ratchet style mechanism with a reel or a cam buckle style mechanism.

It is an object of the present invention to provide a cargo strap that can be more quickly secured around a load than prior art cargo straps, and which provides means for easily carrying the secured load.

BRIEF DESCRIPTION OF THE SEVERAL VIEWS OF THE DRAWING

FIG. 1 is a perspective view of the strap of the present invention, the pin with release arm and clevis, and the first preferred embodiment of the handle of the present invention.

FIG. 2 is a sectional view of the first preferred embodiment of the handle of the present invention showing the strap passing through a tubular portion of the handle, and showing the strap encircling a load, which is diagrammatically shown in dotted outline.

FIG. 3 is a sectional view of the second preferred embodiment of the handle of the present invention, showing the attachment of the handle to the strap.

DETAILED DESCRIPTION OF THE INVENTION

Figure 4:
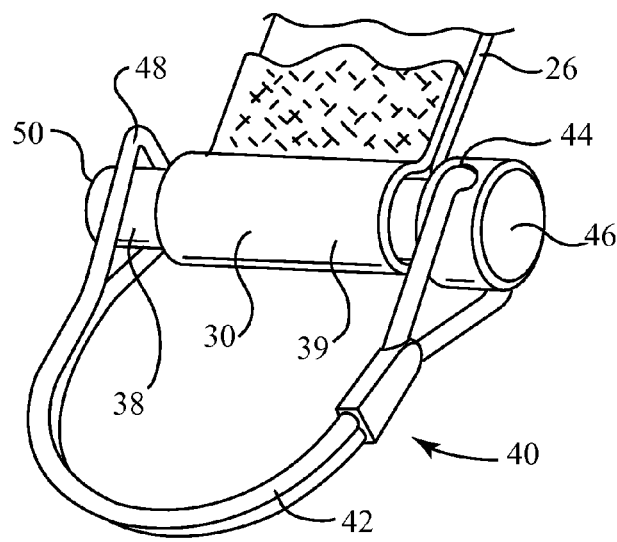
FIG. 4 is a perspective view of the pin of the present invention, with release arm and clevis, passing through a loop at the second end of the strap.

Referring to FIGS. 1-10 and 13-15 of the drawings, two preferred embodiments 1.20 and 2.20 of the apparatus of the present invention are shown, together with two embodiments, 22 and 22', of the handle of the present invention. There are many similarities between the preferred embodiments, and only the differences between each embodiment will be discussed in detail, it being understood that similar structure for the various embodiments serves similar purpose. The reference numerals for the various parts of the embodiments shall be understood to have a prefix identifying the particular embodiment (e.g., "1." or "2.", etc.) and a suffix identifying the particular structure (e.g., "20", "24", etc.). It shall be understood that both embodiments 22 and 22' of the handle of the present invention can be used interchangeably with both embodiments 1.20 and 2.20 of the apparatus of the present invention because the sole difference between the first embodiment 1.20 of the present invention and the second embodiment 2.20 of the present invention is the difference between the structure of the strap securing mechanism 1.24 and 2.24, respectively, of the two embodiments 1.20 and 2.20.

Referring especially to FIGS. 1-3, both embodiments 1.20, 2.20 of the apparatus of the present invention include a strap 26 having a first end 28 and a second end 30 and a first strap portion 32 intermediate first end 28 and second end 30. Strap 26 is preferably made of well-known woven canvas or nylon or polyester. Both embodiments 1.20, 2.20 of the apparatus of the present invention further include a strap handle, preferably either first handle embodiment 22 or second handle embodiment 22'.

First handle embodiment 22, preferably made of durable rigid plastic, includes a tubular portion 34 attached to a handgrip portion 36 of handle 22, with strap 26 passing through and being entrappingly encircled by tubular portion 34.

Both embodiments 1.20 and 2.20 of the apparatus of the present invention also include a pin 38 selectively attaching second end 30 of strap 26 to the strap securing mechanism, 1.24 or 2.24, as appropriate, as by pin 38 passing through a loop 39 formed as by riveting or preferably sewing strap 26 back upon itself at second end 30. Pin 38 has a pin release 40 having a first condition, as shown in FIGS. 7, 8, 13, 14, and 15, in which pin 38 is secured to the strap securing mechanism and attaches second end 30 of strap 26 to the strap securing mechanism, and also having a second condition, as shown in FIGS. 1 and 5, in which pin 38 is unsecured from the strap securing mechanism and does not attach second end 30 of strap 26 to the strap securing mechanism.

Figure 5:
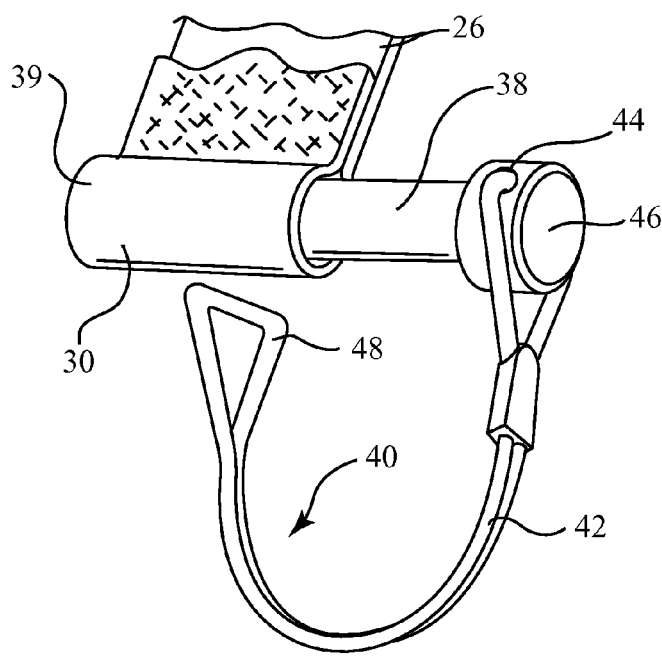
FIG. 5 is a perspective view of the pin of the present invention, similar to FIG. 4, but showing the clevis separated from the pin and the pin being inserted into or being removed from the loop at the second end of the strap.
Figure 6:
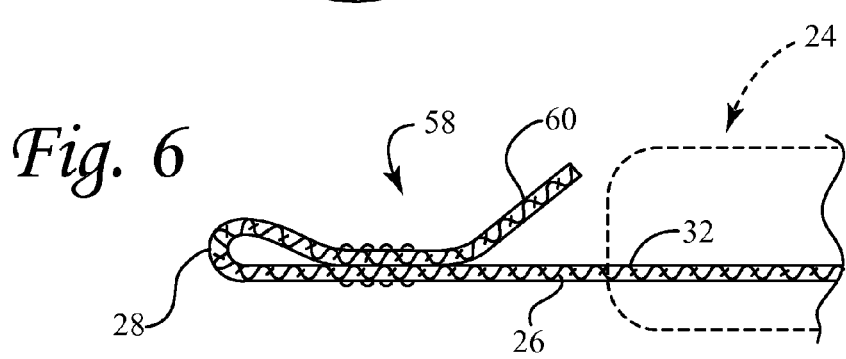
FIG. 6 is a sectional view of the strap stop of the present invention, showing the strap flap inhibiting the removal of the first end of the strap from being through the mechanism, which is shown diagrammatically in dotted outline.
Figure 7:
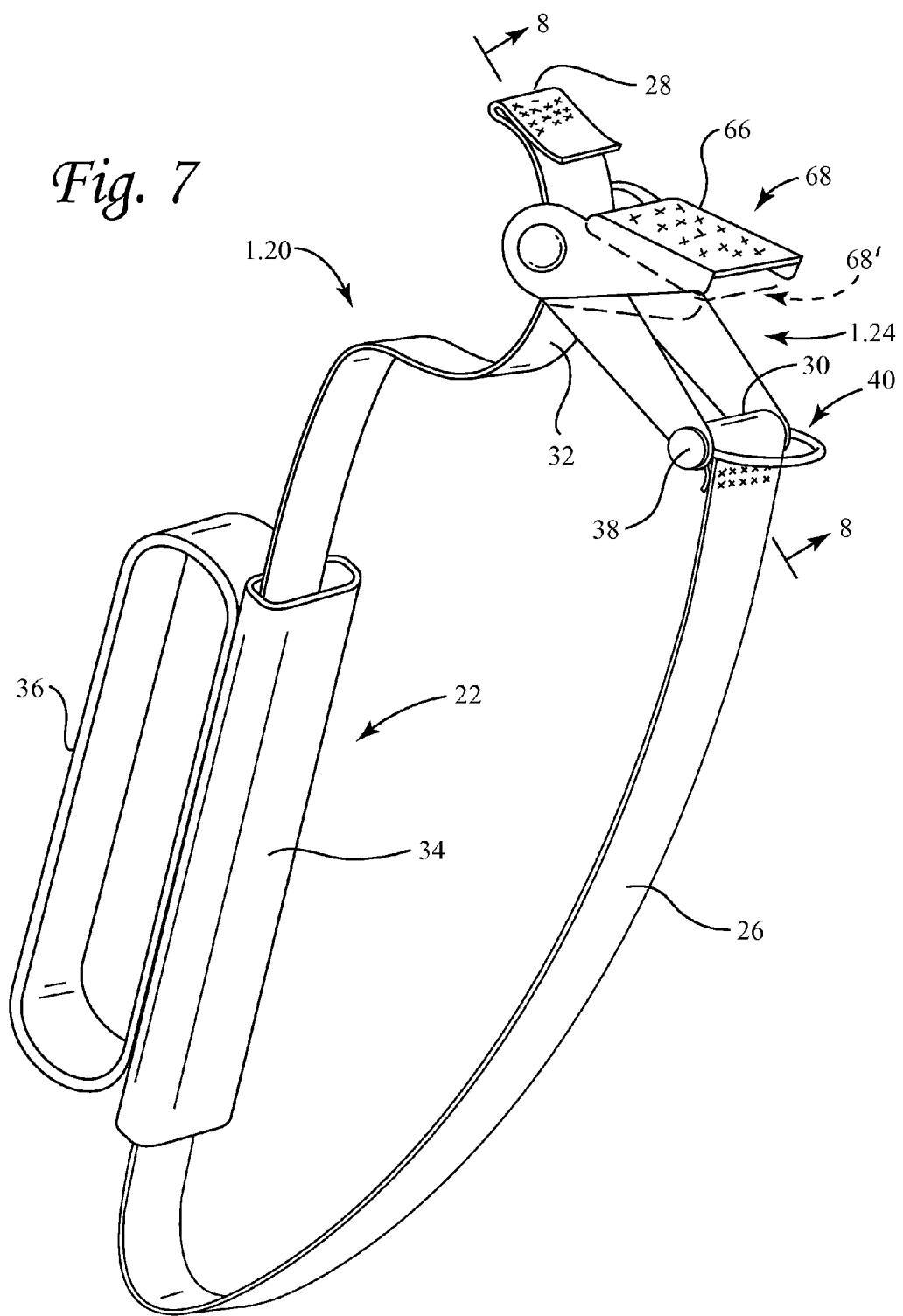
FIG. 7 is a perspective view of a first preferred embodiment of the present invention configured with the first preferred embodiment of the handle.

As best seen in FIGS. 4 and 5, pin release 40 preferably includes a release arm 42, preferably formed of stiff wire, pivotally mounted to pin 38, as by passing through a transverse hole 44 through the head 46 of pin 38. Release arm 42 preferably has a clevis 48 for hooking over and retaining, by the stiffness of release arm 42, the distal end 50 of pin 38, thereby retaining second end 30 of strap 26 to pin 38.

A suitable prior art item for use as pin 38 with release arm 42 and clevis 48 is the well-known 0.25 inch (6.35 mm) safety pin with double-wire snap sold as catalog item number 3DZN8 by W.W. Grainger, Inc., 100 Grainger Parkway, Lake Forest, Ill. 60045. Another suitable prior art item for use as pin 38 with release arm 42 and clevis 48 is the well-known clevis pin sold as Model No. A-113 by Cixi Xinhe Auto Accessory Co., Ltd., ZHangxin Rd., Xinpu Town, Cixi, Zhejiang Province, China.

Second handle embodiment 22', as best seen in FIG. 3, has a handgrip loop 36' that is formed by a second strap portion 52 having first and second ends 54, 56 that are attached, as by sewing or riveting, to strap 26. First handle embodiment 22 has the advantage that it rigidly retains its shape when carrying an unwieldy and/or heavy load, but has the disadvantage that it cannot be compactly rolled with strap 26 for convenient storage. Second handle embodiment 22' has the advantage that it can be compactly rolled with strap 26 for convenient storage, but has the disadvantage that it does not rigidly retain its shape when carrying an unwieldy and/or heavy load.

Strap 26 preferably includes a stop 58 intermediate first strap portion 32 and first end 28 of strap 26, such that the stop 58 selectively engages the strap securing mechanism 1.24 or 2.24 (both generically shown as 24 in FIG. 6), as appropriate, to inhibit the first end of strap 26 from being removed from being through the strap securing mechanism. While stop 58 could equivalently be a screw or rivet through strap 26, preferably stop 58 is a strap flap 60 attached, as by sewing or riveting, to strap 26 proximate the first end 28 of strap 26 and extending toward the strap securing mechanism for engagement therewith as caused by the increased strap width at stop 58.

With this common structure of the preferred embodiments now being understood, the specific differences between the preferred embodiments of the invention can now be more fully explained.

Figure 8:
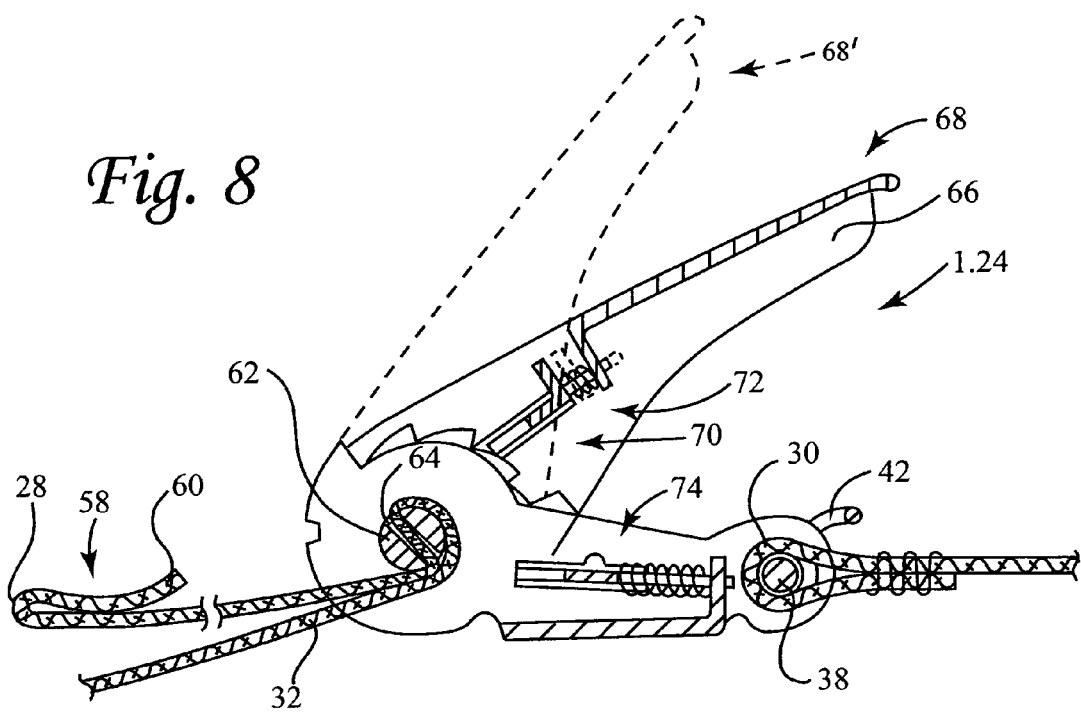
FIG. 8 is a sectional view of the strap securing mechanism of the first preferred embodiment of the invention, showing how the strap becomes wound on the reel as the mechanism arm is moved.

As best seen in FIG. 8, first embodiment 1.20 of the apparatus of the present invention includes as a part of its strap securing mechanism 1.24 a rotating reel 62 upon which strap 26 is wound to tighten the strap about a load. Reel 62 has an enlarged transverse slot 64 through which first strap portion 32 of strap 26 passes. When first strap portion 32 of strap 26 is wound upon reel 62, the mutual friction of adjacent wound layers of strap 26 prevents first strap portion from moving longitudinally through slot 64. Mechanism 1.24 includes a mechanism arm 66 that moves through angular positions (68, 68', for example) to engage a ratchet and pawl 70 for winding first strap portion 32 of strap 26 upon the reel 62. When pawl mechanisms 72 and 74 are manually released, the reel 62 is permitted to unwind in the well-known manner, allowing first strap portion 32 to become unwound and thus untightened from about a load. It is thus understood that strap securing mechanism 1.24 has a first mode, when reel 62 is unwound so that first strap portion 32 can freely move through transverse slot 64, in which first strap portion 32 may move longitudinally through and with respect to mechanism 1.24, thereby allowing strap 26 to be cinched around or unloosened from a load. It is thus further understood that strap securing mechanism 1.24 also has a second mode, when first strap portion 32 is wound upon reel 62 and adjacent wound layers of strap 26 frictionally engage one another, in which mechanism 1.24 prevents first strap portion 32 from moving longitudinally through and with respect to mechanism 1.24, thereby holding strap 26 tightly about a load.

A suitable prior art item for use as strap securing mechanism 1.24 of first embodiment 1.20 is the ratchet-type mechanism sold as Model No. EB039 TUV/GS by Qungdao Ever Bright Import & Export Co., Ltd., Room 302, Unit 1, Building 2, Luxinchangle Garden, No. 39, Fuzhou South Road, Shinan Dist., Qingdao, Shandong Province, China. Another equivalent suitable prior art item for use as strap securing mechanism 1.24 of first embodiment 1.20 is the ratchet-type mechanism used in the Erickson Ratchet Strap with S Hook, Erickson Model No. 31352, sold as catalog item number 5EFE0 by W.W. Grainger, Inc., 100 Grainger Parkway, Lake Forest, Ill. 60045. As described hereinabove, the prior art ratchet-type strap securing mechanism is modified for use with the present invention by removing the swaged pin that typically anchors the cargo strap to the body of the strap securing mechanism, thereby enabling the pin 38 with release arm 42 and clevis 48 to selectively and removably attach the cargo strap to the body of the strap securing mechanism.

Figure 9:
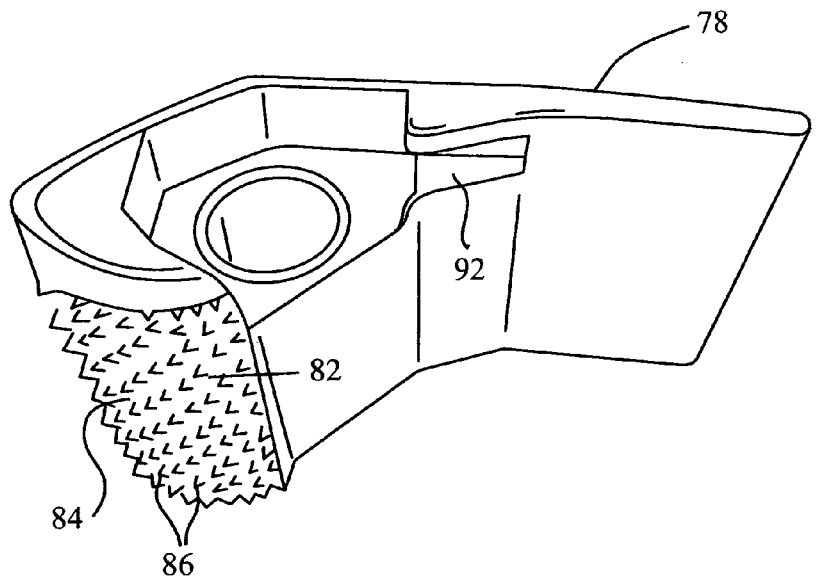
FIG. 9 is a perspective view of a prior art cam arm with cam portion, as also used with the strap securing mechanism of second preferred embodiment of the present invention.
Figure 10:
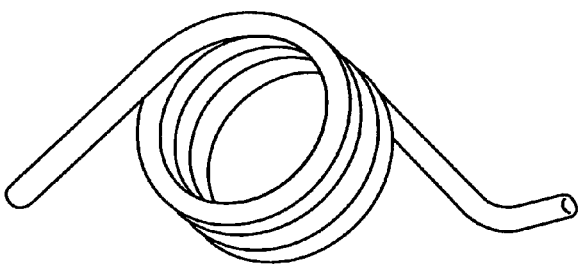
FIG. 10 is a perspective view of a spring that biases the cam arm into its cam-engaged position, enlarged somewhat as compared with FIG. 9.
Figure 13:
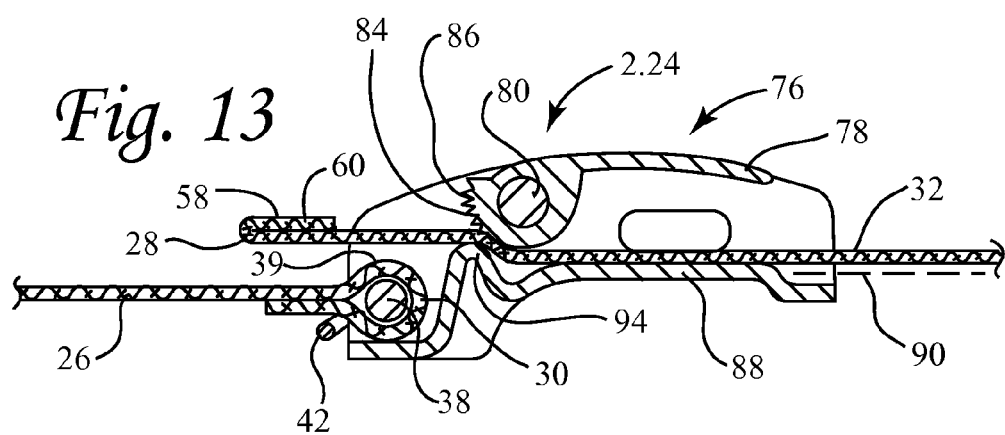
FIG. 13 is a sectional view of the improved cam buckle mechanism of the second preferred embodiment of the present invention.
Figure 14:
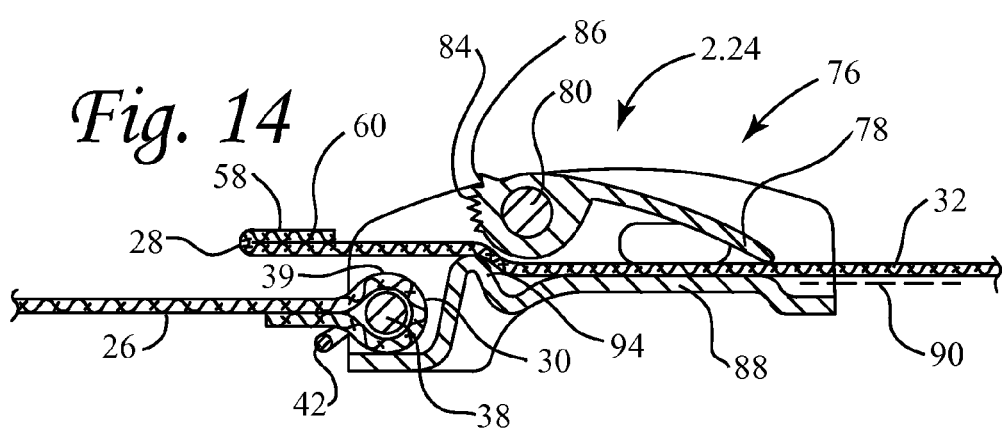
FIG. 14 is a sectional view of the improved cam buckle mechanism of the second preferred embodiment of the present invention, similar to FIG. 12 but showing the cam arm in a moved position.
Figure 15:
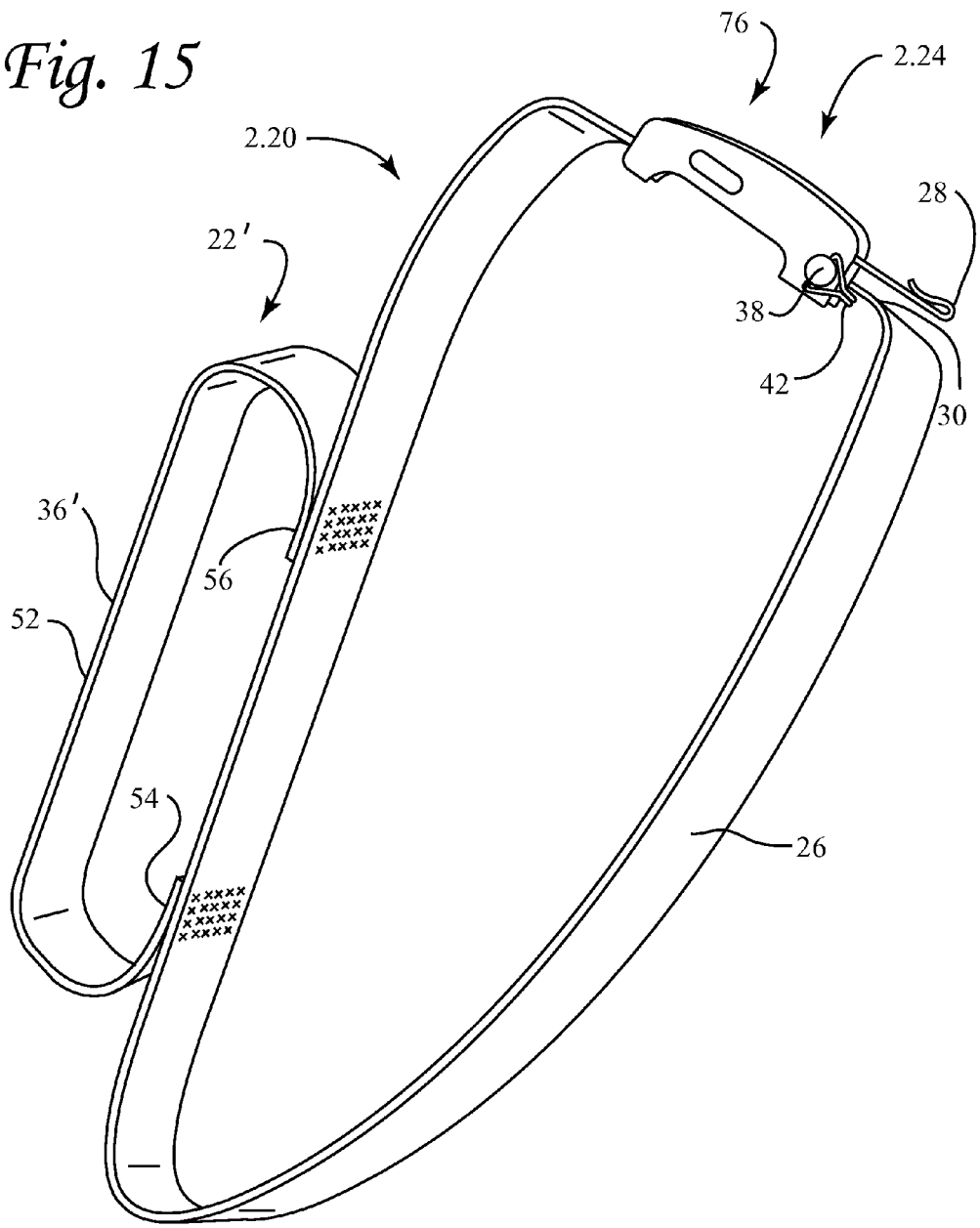
FIG. 15 is a perspective view of the second preferred embodiment of the present invention shown configured with the second preferred embodiment of the handle.

As best seen in FIGS. 13 and 14, second embodiment 2.20 of the apparatus of the present invention includes as a part of its strap securing mechanism 2.24 a buckle 76, and buckle 76 has a cam arm 78 mounted for pivoting movement upon mechanism 2.24 as by being mounted upon an axle 80 mounted within buckle 76. A prior art cam arm as shown in FIG. 9 is acceptable for use as cam arm 78, and has a cam portion 82 including a friction surface 84, such as a plurality of teeth 86, for engaging first strap portion 32 of strap 26 as cam arm 78 pivots about axle 80. Buckle 76 preferably includes a transverse member 88 substantially defining a horizontal plane 90, with first strap portion 32 passing over transverse member 88 and engaging friction surface 84 above horizontal plane 90, and with second end 30 of strap 26 being attached to strap securing mechanism 2.24 below horizontal plane 90, as by pin 38 being mounted to the frame of buckle 76 and passing through loop 39 of strap 26. A spring, such as the prior art spring shown in FIG. 10, is received about axle 80 with one end being retained in recess 92 of cam arm 78, and rotationally biases cam arm 78 so that friction surface 84 engages first strap portion 32 when cam arm 78 is not depressed toward buckle 76. It is thus understood that strap securing mechanism 2.24 has a first mode, when friction surface 84 does not engage first strap portion 32 against transverse plate 94 of buckle 76 (as shown in FIG. 14), in which first strap portion 32 may move longitudinally through and with respect to mechanism 2.24, thereby allowing strap 26 to be cinched around or unloosened from a load. It is thus further understood that strap securing mechanism 2.24 also has a second mode, when friction surface 84 engages first strap portion 32 against transverse plate 94 of buckle 76 (as shown in FIG. 13), in which mechanism 2.24 prevents first strap portion 32 from moving longitudinally through and with respect to mechanism 1.24, thereby holding strap 26 tightly about a load.

Figure 11:
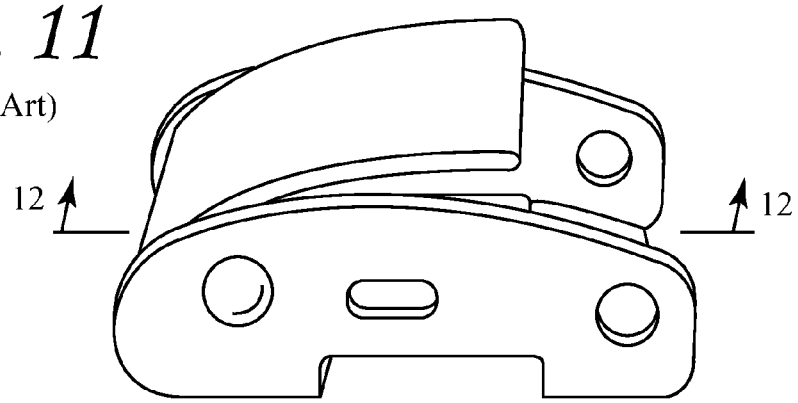
FIG. 11 is a perspective view of a prior art cam buckle mechanism.
Figure 12:
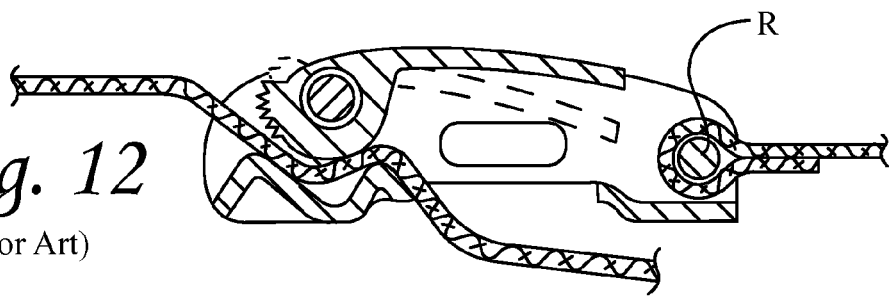
FIG. 12 is a sectional view of the prior art cam buckle mechanism shown in FIG. 11 showing movement of the buckle's cam arm, taken substantially along the line 12-12 shown in FIG. 11.

The strap securing mechanism 2.24 of second embodiment 2.20 is a modified design of the prior art cam buckle type mechanism of FIGS. 11 and 12 sold as Model No. RRTD012B by Ningbo Reach Industrial Co., Ltd., No. 427, Xujiacao Road, Haishu District, Ningbo, Zhejiang Province, China, or a modified design of an equivalent cam buckle type mechanism used in the Ancra International Cam Buckle style Web Strap with S Hooks, Ancra International Model No. 6G4242MIN92P2, sold as catalog item number 3YAX9 by W.W. Grainger, Inc., 100 Grainger Parkway, Lake Forest, Ill. 60045. Unlike the strap securing mechanism 2.24 of the present invention, prior art cam buckle type mechanisms fixedly and non-removably attach the strap to the rear of the cam buckle mechanism's body as by a rivet R, rather than removably attaching the strap to the front of the cam buckle mechanism's body as by pin 38 with pin release 40, below the plane of the transverse member 88.

To use either embodiment of the present invention, a load is first encircled by strap 26. For many loads, this can be done simply by putting the strap securing mechanism into the first mode, so that the first strap portion moves freely through the strap securing mechanism, thereby allowing the encircling loop of the strap to encircle the load. For some loads, particularly long loads, it may be more convenient to release pin 38 from loop 39 at second end 30 of strap 26, such that pin 38 does not attach second end 30 of strap 26 to the strap securing mechanism, then pass second end 30 of strap 26 around the load and then reattach second end 30 of strap 26 to the strap securing mechanism. Next, the strap 26 is tightened about the load in a manner heretofore described for each of the respective strap securing mechanism embodiments 1.24, 2.24, and the load may then be carried conveniently by the handle 22, 22'. When the load has been carried to a destination, the strap can be loosened and the apparatus can be removed from the load.

INDUSTRIAL APPLICABILITY

The cargo strap with handle and strap securing mechanism of the present invention is used to secure a load and carry a secured load. As compared to the prior art, the strap can be secured around the load more quickly and easily than the prior art cargo strap devices, and provides a handle for carrying the load.

Although the present invention has been described and illustrated with respect to a preferred embodiment and a preferred use therefor, it is not to be so limited since modifications and changes can be made therein which are within the full intended scope of the invention.

I claim:

1. An apparatus for securing and carrying a load, said apparatus comprising:
   (a) a strap having a first end and a second end and a first strap portion intermediate said first end and said second end, said strap including a handle, said handle being rigid and having a handgrip loop and a tubular portion, said handgrip loop being rigidly attached along an upper surface of said tubular portion with said strap passing through and being entrappingly encircled by said tubular portion;
   (b) a strap securing mechanism, said first end of said strap being through said mechanism; said mechanism having a first mode in which said first strap portion may move longitudinally through and with respect to said mechanism, and having a second mode in which said mechanism prevents said first strap portion from moving longitudinally through and with respect to said mechanism; and
   (c) a pin selectively attaching said second end of said strap to said mechanism, said pin having a pin release and having a first condition in which said pin is secured to said mechanism and attaches said second end of said strap to said mechanism, and having a second condition in which said pin is unsecured from said mechanism and does not attach said second end of said strap to said mechanism.

2. The apparatus as recited in claim 1, in which said pin release has a clevis.

3. The apparatus as recited in claim 1, in which said pin release includes a release arm pivotally mounted to said pin, and said release arm has a clevis.

4. The apparatus as recited in claim 1, in which said strap includes a stop intermediate said first strap portion and said first end of said strap, said stop selectively engaging with said mechanism to inhibit said first end of said strap from being removed from being through said mechanism.

5. The apparatus as recited in claim 4, in which said stop includes a strap flap attached to said strap proximate said first end of said strap and extending toward said mechanism for engagement therewith.

6. The apparatus as recited in claim 1, in which said mechanism includes a reel upon which said strap becomes wound, and a mechanism arm for turning said reel, thereby winding said strap upon said reel and causing said strap to tighten around the load.

7. The apparatus as recited in claim 6, further in which:
   (a) said pin release includes a release arm pivotally mounted to said pin, and said release arm has a clevis;
   (b) said strap includes a stop intermediate said first strap portion and said first end of said strap, said stop selectively engaging with said mechanism to inhibit said first end of said strap from being removed from being through said mechanism, said stop including a strap flap attached to said strap proximate said first end of said strap and extending toward said mechanism for engagement therewith.

8. The apparatus as recited in claim 1, in which said mechanism includes a buckle, said buckle having a cam arm mounted for pivoting movement upon said mechanism, said cam arm having a cam portion, said cam portion including a friction surface for engaging said first strap portion as said cam arm pivots; said buckle including a transverse member substantially defining a horizontal plane, said first strap portion passing over said transverse member and engaging said friction surface above said horizontal plane, and said second end of said strap being attached to said mechanism below said horizontal plane.

9. The apparatus as recited in claim 8, further in which:
   (a) said pin release includes a release arm pivotally mounted to said pin, and said release arm has a clevis;
   (b) said strap includes a stop intermediate said first strap portion and said first end of said strap, said stop selectively engaging with said mechanism to inhibit said first end of said strap from being removed from being through said mechanism, said stop including a strap flap attached to said strap proximate said first end of said strap and extending toward said mechanism for engagement therewith.

10. An apparatus for securing and carrying a load, said apparatus comprising:
    (a) a strap having a first end and a second end and a first strap portion intermediate said first end and said second end, said strap including a handle;
    (b) a strap securing mechanism, said first end of said strap being through said mechanism; said mechanism having a first mode in which said first strap portion may move longitudinally through and with respect to said mechanism, and having a second mode in which said mechanism prevents said first strap portion from moving longitudinally through and with respect to said mechanism; said mechanism including a buckle, said buckle having a cam arm mounted for pivoting movement upon said mechanism, said cam arm having a cam portion, said cam portion including a friction surface for engaging said first strap portion as said cam arm pivots; said buckle including a transverse member substantially defining a horizontal plane, said first strap portion passing over said transverse member and engaging said friction surface above said horizontal plane, and said second end of said strap being attached to said mechanism below said horizontal plane; and
    (c) a pin selectively attaching said second end of said strap to said mechanism, said pin having a pin release, said pin release including a release arm pivotally mounted to said pin, said release arm having a clevis; said pin release having a first condition in which said pin is secured to said mechanism and attaches said second end of said strap to said mechanism, and having a second condition in which said pin is unsecured from said mechanism and does not attach said second end of said strap to said mechanism.

* * * * *